(12) United States Patent
Tanigami (10) Patent No.: US 10,491,767 B2
(45) Date of Patent: Nov. 26, 2019

(54) IMAGE FORMING APPARATUS AND IMAGE FORMING METHOD

(71) Applicant: KONICA MINOLTA, INC., Chiyoda-ku, Tokyo (JP)

(72) Inventor: Shinya Tanigami, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/121,927

(22) Filed: Sep. 5, 2018

(65) Prior Publication Data

US 2019/0082067 A1 Mar. 14, 2019

(30) Foreign Application Priority Data

Sep. 8, 2017 (JP) .................................. 2017-172778

(51) Int. Cl.
H04N 1/00 (2006.01)

(52) U.S. Cl.
CPC ..... *H04N 1/00602* (2013.01); *H04N 1/00689* (2013.01); *H04N 1/00708* (2013.01); *H04N 1/00724* (2013.01); *H04N 1/00726* (2013.01)

(58) Field of Classification Search
CPC .......... H04N 1/00602; H04N 1/00689; H04N 1/00708; H04N 1/00724; H04N 1/00726
USPC ............................................... 358/1.15, 498
See application file for complete search history.

(56) References Cited

U.S. PATENT DOCUMENTS

| | | | | |
|---|---|---|---|---|
| 2003/0035030 A1* | 2/2003 | Hamamoto | .......... | B41J 2/04528 347/57 |
| 2011/0001996 A1* | 1/2011 | Yokoyama | ......... | G03G 15/5062 358/1.12 |
| 2015/0078771 A1* | 3/2015 | Tanigami | .......... | G03G 15/6529 399/45 |
| 2015/0326743 A1* | 11/2015 | Yabuuchi | .......... | H04N 1/00708 358/498 |
| 2016/0378042 A1* | 12/2016 | Tanaka | ............... | G03G 15/6511 271/10.03 |
| 2018/0050881 A1* | 2/2018 | Tanigami | .......... | G03G 15/6529 |
| 2018/0148288 A1* | 5/2018 | Sugai | ....................... | B65H 7/02 |
| 2019/0052767 A1* | 2/2019 | Nagano | .............. | H04N 1/00588 |
| 2019/0082067 A1* | 3/2019 | Tanigami | .......... | H04N 1/00602 |

FOREIGN PATENT DOCUMENTS

JP 2012181223 A 9/2012

\* cited by examiner

*Primary Examiner* — Negussie Worku

(74) *Attorney, Agent, or Firm* — Buchanan Ingersoll & Rooney PC (57) ABSTRACT

An image forming apparatus includes: image former forming an image on a sheet; a sheet storage storing the sheet; a sheet feeder feeding the sheet stored in the sheet storage to the image former; a sheet characteristic detector detecting characteristics of the sheet fed by the sheet feeder; and a hardware processor controlling image forming in the image former on the basis of the sheet characteristics detected by the sheet characteristic detector, wherein the sheet feeder feeds a first sheet in order to detect the sheet characteristics by the sheet characteristic detector before forming an image by the image former, and after the sheet characteristic detector has finished detecting the characteristics of the first sheet, the sheet feeder feeds a second sheet on which the image is to be formed by the image former under image forming conditions set on the basis of the detected characteristics of the first sheet.

12 Claims, 10 Drawing Sheets

IMAGE FORMING APPARATUS AND IMAGE FORMING METHOD

The entire disclosure of Japanese patent Application No. 2017-172778, filed on Sep. 8, 2017, is incorporated herein by reference in its entirety.

BACKGROUND

Technological Field

The present invention relates to an image forming apparatus and an image forming method.

Description of the Related Art

In an image forming apparatus in the related art, image forming is performed by setting appropriate sheet conveyance conditions and the like on the basis of a type of a sheet and the like. Therefore, there is a known image forming apparatus including, inside the image forming apparatus, a determination device that automatically determines a type of a sheet and the like (refer to JP 2012-181223 A).

However, since appropriate sheet feeding conditions and the like are unknown before determining a type of a sheet or the like by a determination device, there may be a possibility in which a sheet feeding error such as no feed or double feed is caused.

SUMMARY

The present invention has been made in the view of the above-described problem in the related art, and an object of the present invention is to prevent occurrence of feeding failure of a sheet used to determine a type and the like thereof in an image forming apparatus and an image forming method of the present invention.

To achieve the abovementioned object, according to an aspect of the present invention, an image forming apparatus reflecting one aspect of the present invention comprises: image former that forms an image on a sheet; a sheet storage that stores the sheet; a sheet feeder that feeds the sheet stored in the sheet storage to the image former; a sheet characteristic detector that detects characteristics of the sheet fed by the sheet feeder; and a hardware processor that controls image forming in the image former on the basis of the sheet characteristics detected by the sheet characteristic detector, wherein the sheet feeder feeds a first sheet in order to detect the sheet characteristics by the sheet characteristic detector before forming an image by the image former, and after the sheet characteristic detector has finished detecting the characteristics of the first sheet, the sheet feeder feeds a second sheet on which the image is to be formed by the image former under image forming conditions set on the basis of the detected characteristics of the first sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of an image forming apparatus of the present invention (hereinafter referred to as the present example) will be described with reference to the drawings. However, the scope of the invention is not limited to the disclosed embodiments.

Figure 1:
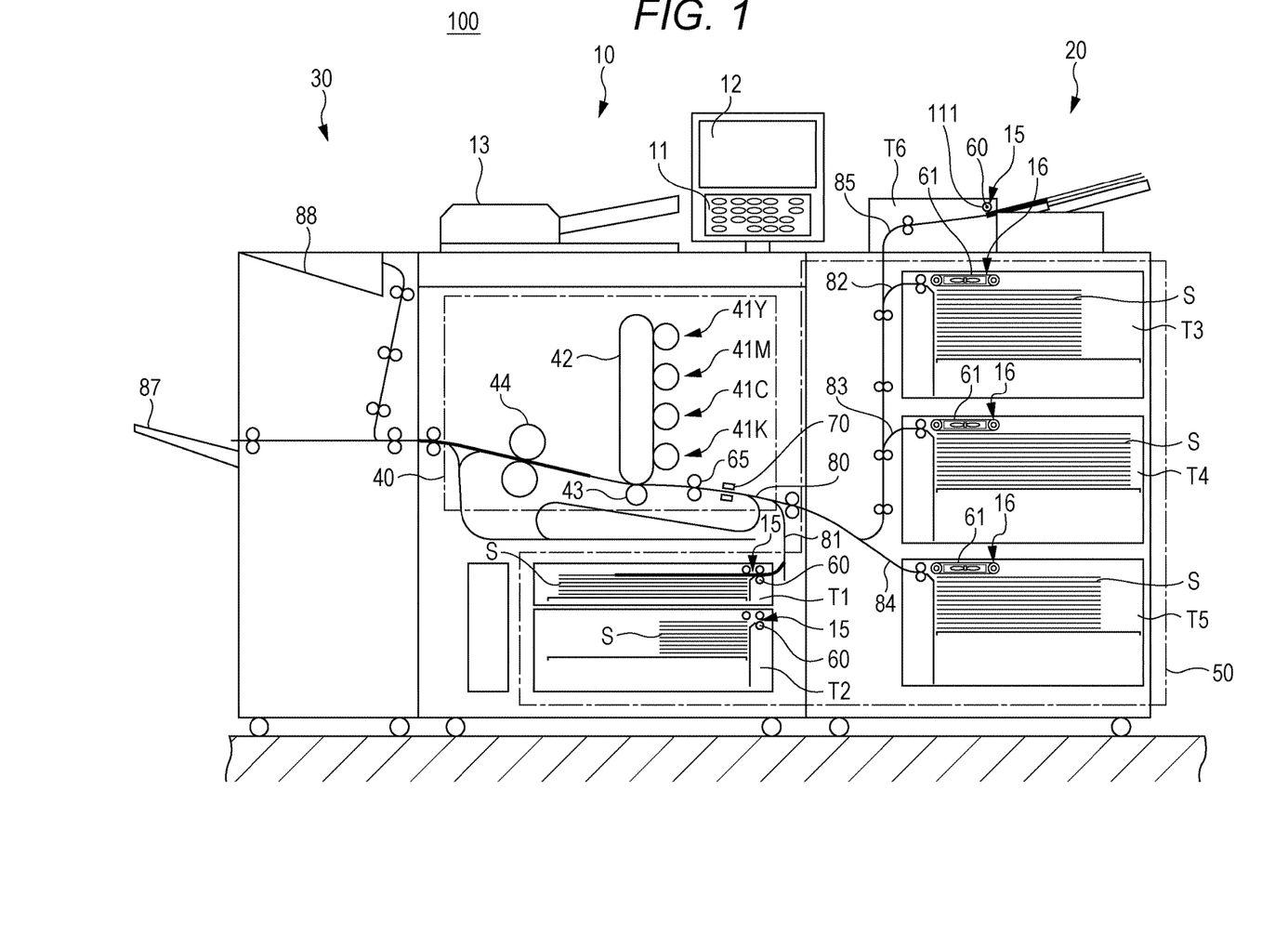
FIG. 1 is a schematic structure view of an image forming apparatus according to an embodiment of the present invention.

FIG. 1 is a schematic structure view of an image forming apparatus 100 of the present example. As illustrated in FIG. 1, the image forming apparatus 100 includes an image forming apparatus main body 10, a sheet feeding device 20, a sheet ejection device 30, and the like.

The image forming apparatus main body 10 includes an operation unit 11, a display 12, an image reader 13, an image former 40, a sheet storage 50, and the like. The sheet storage 50 of the present example includes a plurality of sheet feeding trays T1 to T6, and feeds sheets from one of the sheet feeding trays T1 to T6. Additionally, in the sheet feeding trays T1 to T5, sheets each having a type (size, paper kind, basis weight, and the like) predetermined per sheet feeding tray are stored, and as for the sheet feeding tray (manual feeding tray) T6, sheet is set as necessary.

Figure 4:
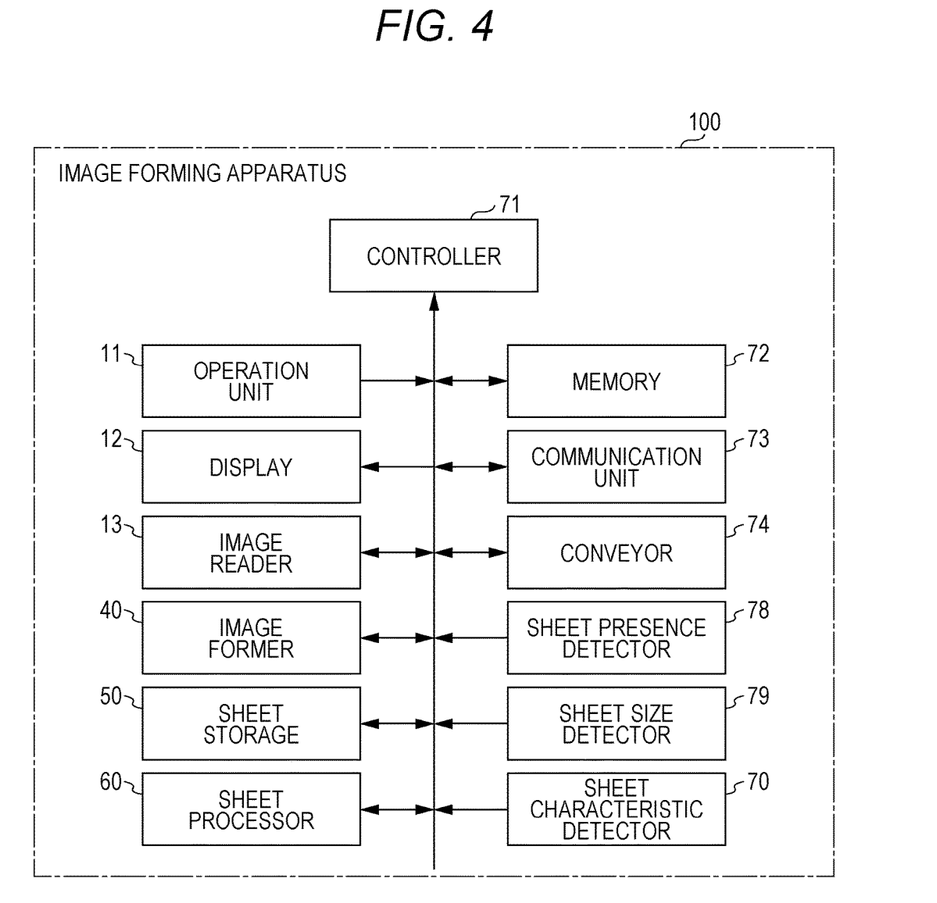
FIG. 4 is a block diagram illustrating functional components of the image forming apparatus according to the embodiment of the present invention.

The operation unit 11 includes: a touch panel formed in a manner covering a display screen of the display 12; and various kinds of operation buttons such as numerical buttons and a start button, and transmits an operation signal based on user's operation to a controller 71 (refer to FIG. 4).

The display 12 is formed of a liquid crystal display (LCD), and displays various kinds of screens in accordance with a command of a display signal received from the controller 71.

The image reader 13 includes an automatic document feeding device (ADF), a scanner, and the like, and outputs image data obtained by reading an image of a document to the controller 71.

The image former 40 forms an image on a sheet fed from the sheet storage 50 on the basis of image data read by the image reader 13 or image data received from an external device.

The image former 40 includes: photosensitive drums 41Y, 41M, 41C, and 41K corresponding to respective colors of yellow (Y), magenta (M), cyan (C), and black (K); an intermediate transfer belt 42; a secondary transfer roller 43; a fixing unit 44, and the like, and performs image forming.

After the photosensitive drum 41Y is uniformly electrically charged, the photosensitive drum 41Y is scanned and exposed with a laser beam on the basis of yellow color image data, and an electrostatic latent image is formed. Then, yellow toner is made to adhere to the electrostatic latent image on the photosensitive drum 41Y, and development is performed. The photosensitive drums 41M, 41C, and 41K are similar to the photosensitive drum 41Y except that handled colors are different, and therefore, the description therefor will be omitted.

Toner images of the respective colors formed on the photosensitive drums 41Y, 41M, 41C, and 41K are sequentially transferred onto the intermediate transfer belt 42 that is being rotated (primary transfer). In other words, a color toner image obtained by superimposing four color toner images is formed on the intermediate transfer belt 42. The color toner image on the intermediate transfer belt 42 is collectively transferred onto a sheet conveyed by the secondary transfer roller 43 through a common conveyance path 80 (secondary transfer).

The fixing unit 44 includes: a heating roller that heats a sheet onto which a color toner image has been transferred; and a pressure roller that presses the sheet to fix the color toner image onto the sheet by heating and pressurizing.

A registration roller 65 including a pair of roller members is arranged on an upstream side of the secondary transfer roller 43 of the conveyance path 80. Additionally, a sheet characteristic detection sensor 70 serving as a sheet characteristic detector is provided on an upstream side of the registration roller 65.

The sheet storage 50 of the image forming apparatus main body 10 includes a tray T1 and a tray T2. Each of the tray T1 and the tray T2 includes a sheet feeder 60 in order to feed stored sheets. The sheet feeder 60 in each of the tray T1 and the tray T2 includes a sheet feeding roller 111 and feeds, by frictional force generated between the sheet feeding roller 111 and a sheet, a sheet stored in each of the trays. Each of the tray T1 and the tray T2 includes an individual conveyance path 81 that conveys the fed sheet.

The sheet feeding device 20 includes the sheet storage 50 and a manual feeding tray T6.

The sheet storage 50 of the sheet feeding device 20 includes the tray T3, tray T4, and tray T5. Each of the tray T3, tray T4, and tray T5 includes a sheet feeder 61 to feed stored sheets. The sheet feeder 61 in each of the tray T3, tray T4, and tray T5 includes a suction fan 123 and the like, and feeds a sheet stored in the tray by utilizing air suction force. The tray T3, tray T4, and tray T5 include conveyance paths 82, 83, and 84 respectively in order to convey sheets.

The manual feeding tray T6 is formed at an upper portion of the sheet feeding device 20, and includes a sheet feeder 60 in order to feed a set sheet. The sheet feeder 60 of the tray T6 includes a sheet feeding roller 111 and feeds, by frictional force generated between the sheet feeding roller 111 and a sheet, a sheet set on the tray. The tray T6 includes an individual conveyance path 85 in order to convey the fed sheet.

The individual conveyance paths 82 to 85 of the respective trays in the sheet feeding device 20 are joined to the individual conveyance paths 81 of the trays T1 and T2 in the image forming apparatus main body 10, thereby forming the common conveyance path 80 inside the image forming apparatus main body 10.

The sheet ejection device 30 applies, to a sheet on which an image has been formed by the image former 40, sheet processing such as sort processing, staple processing, punching processing, folding processing, bookbinding processing, and the like as necessary. Additionally, the sheet ejection device 30 includes a main sheet ejection tray 87 and a sub sheet ejection tray 88, and ejects a sheet to one of the sheet ejection trays 87 and 88.

Figure 2:
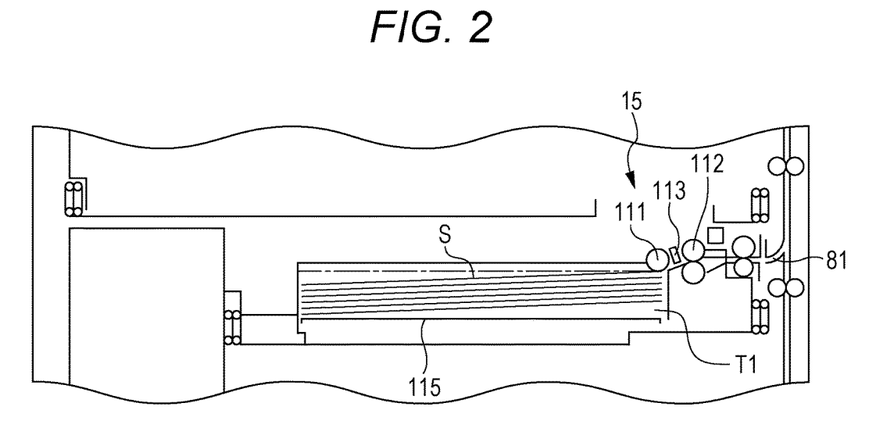
FIG. 2 is a schematic structure view of a sheet feeding tray used in the image forming apparatus according to the embodiment of the present invention.

FIG. 2 is a schematic structure view of the tray T1 of the image forming apparatus main body 10 illustrated in FIG. 1.

As illustrated in FIG. 2, a sheet loading plate 115 biased upward is provided inside the tray T1, and a plurality of sheets S is placed thereon.

Above such sheets S, a roller sheet feeder 15 of a roller type is provided. The roller sheet feeder 15 serving as a first sheet feeder includes: a sheet feeding roller 111 that contacts an uppermost sheet S; and a conveyance roller 112 provided along the conveyance path 81 adjacent to the sheet feeding roller 111. Additionally, a sheet presence detection sensor 113 that detects presence of a sheet S to be fed is provided between the sheet feeding roller 111 and the conveyance roller 112. Meanwhile, the tray T6 of the sheet feeding device 20 also has substantially the same structure except that the sheet loading plate 115 is not biased.

Figure 3:
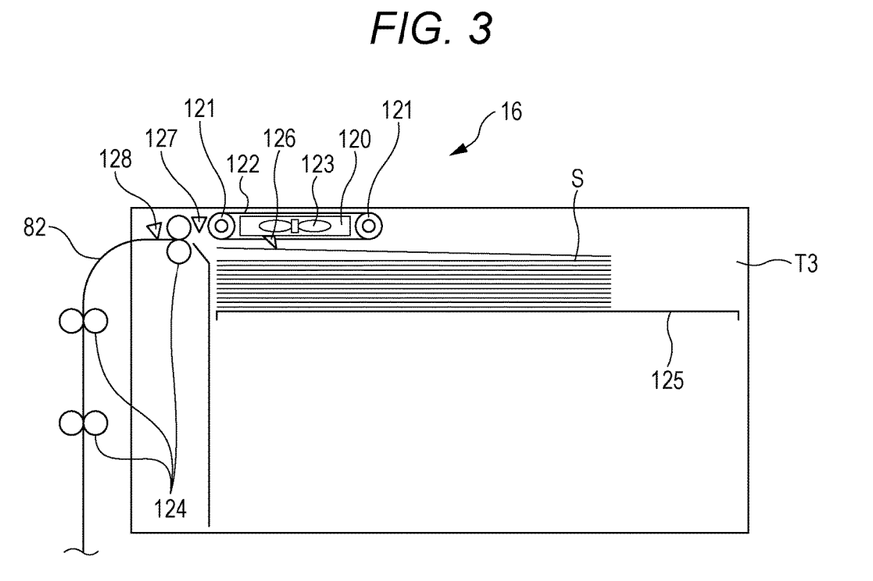
FIG. 3 is a schematic structure view of another sheet feeding tray used in the image forming apparatus according to the embodiment of the present invention.

FIG. 3 is an enlarged front view of the tray T3 of the sheet feeding device 20 illustrated in FIG. 1.

As illustrated in FIG. 3, a sheet loading plate 125 biased upward is provided inside the tray T3, and a plurality of sheets S is placed thereon.

Above the sheets S, a suction type air sheet feeder 16 serving as a second sheet feeder is provided. The air sheet feeder 16 includes a conveyance belt 122 arranged in a manner facing the sheets S, two drive rollers 121 to drive the conveyance belt 122, a suction duct 120 provided inside the conveyance belt 122, and a suction fan 123 provided inside the suction duct 120 and adapted to generate suction air. Additionally, separation air fans (not illustrated) are also provided to blow air to a sheet leading edge and a sheet side portion respectively. A suction air amount can be adjusted by not only controlling a speed of the suction fan 123 but also by providing a plurality of suction fans and changing the number of suction fans to be driven.

At a lower portion of the suction duct 120, a sheet suction sensor 126 is provided in a manner facing the sheets S loaded on the sheet loading plate 125. Additionally, a plurality of conveyance rollers 124 is provided along the conveyance path 82, and a sheet presence detection sensor 127 is provided between the conveyance roller 124 on the most upstream side and the drive roller 121, and an exit sensor 128 is provided on a downstream side of the sheet presence detection sensor 127. Meanwhile, each of the tray T4 and tray T5 is also provided with the air sheet feeder 16 having the same structure.

Generally, air sheet feeding by the air sheet feeder 16 has conveyance performance superior to that of the roller sheet feeder 15 because of sheet suction to the conveyance belt 122 by the suction fan 123 and the separation air fans from the sheet leading edge side and the sheet lateral side.

Therefore, sheets of various paper kinds and various basis weights can be conveyed by using the air sheet feeder 16. On the other hand, in a case where an air blow rate of the suction fan or the like is not appropriate, there may be a risk of causing a feeding operation failure in which feeding is performed in a state in which a sheet S is not completely sucked to the conveyance belt 122 or causing a malfunction such as double feed due to a plurality of sheets S being sucked to the conveyance belt 122.

FIG. 4 is a block diagram illustrating functional components of the image forming apparatus 100. As illustrated in FIG. 4, the image forming apparatus 100 includes the operation unit 11, the display 12, the image reader 13, the image former 40, the sheet storage 50, the sheet processor 60, the sheet characteristic detector 70, the controller 71, a memory 72, a communication unit 73, a conveyor 74, a sheet presence detector 78, a sheet size detector 79, and the like. Note that the description of the functional components that have been already described will be omitted.

The controller 71 includes a central processing unit (CPU), a read only memory (ROM), a random access memory (RAM), and the like. The CPU reads various kinds of processing programs stored in the ROM in accordance with an operation signal input from the operation unit 11 or a command signal received from the communication unit 73, develops the program in the RAM, and performs centralized control for each of the components of the image forming apparatus 100 in accordance with the developed program.

The memory 72 is formed of a hard disk, a flash memory, or the like, and stores various kinds of data. The memory 72 stores, as for each of the plurality of sheet feeding trays T1 to T6, a sheet characteristic indicating a type of a sheet stored in the sheet feeding tray, for example.

The communication unit 73 exchanges data with an external device connected to a communication network such as a local area network (LAN).

The conveyor 74 includes conveyance rollers and the like to convey sheets, and conveys the sheets inside the image forming apparatus 100.

The sheet presence detector 78 is provided in each of the sheet feeding trays T1 to T6 of the sheet storage 50, detects presence or absence of a sheet stored in each of the sheet feeding trays T1 to T6 and presence or absence of a sheet on the conveyance path, and outputs a detection result to the controller 71.

The sheet size detector 79 is provided in each of the sheet feeding trays T1 to T6 of the sheet storage 50, detects a size of a sheet stored in each of the sheet feeding trays T1 to T6, and outputs a detection result to the controller 71.

The sheet characteristic detector 70 is provided on an upstream side of the registration roller 65 in the common conveyance path 80, detects a characteristic of a sheet on the conveyance path 80 in a state of making the sheet abut on the registration roller 65, and outputs a detection result to the controller 71 as sheet characteristic information.

Figure 5:
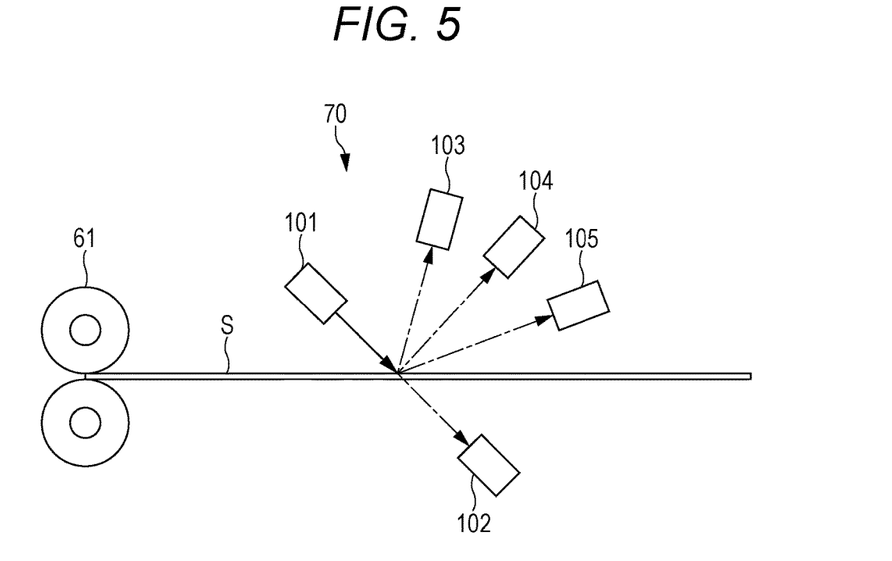
FIG. 5 is a side view illustrating a schematic structure of a sheet characteristic detection sensor used in the image forming apparatus according to the embodiment of the present invention.

FIG. 5 is a side view illustrating a schematic structure of the sheet characteristic detection sensor 70 used in the present embodiment.

As illustrated in FIG. 5, the sheet characteristic detection sensor 70 includes a light emitting portion 101 formed of a light emitting element (LED) and a plurality of light receiving portions 102 to 105 each formed of phototransistor (light receiving element).

The light receiving portion 102 is provided at a position on an opposite side of a side provided with the light emitting portion 101 with respect to a sheet S in a manner facing the light emitting portion 101. The light emitted from the light emitting portion 101 passes through the sheet S and is incident on the light receiving portion 102, and the light incident on the light receiving portion 102 is converted into a received light voltage.

Figure 6:
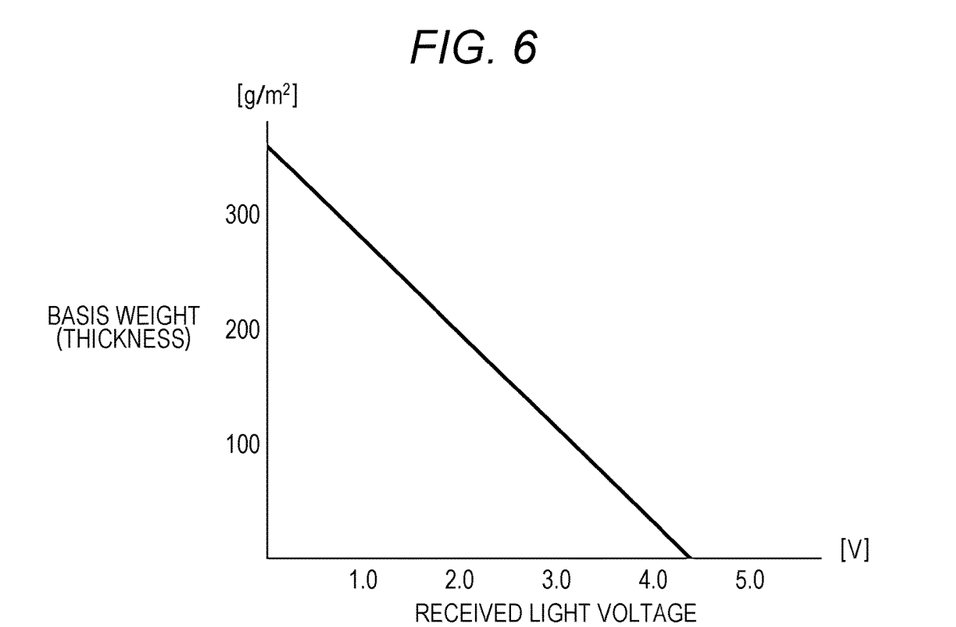
FIG. 6 is a graph illustrating a relation between a basis weight of a sheet S detected by the sheet characteristic detection sensor used in the present embodiment and a received light voltage.

FIG. 6 is a graph illustrating a relation between a basis weight of a sheet S and a received light voltage.

In the graph of FIG. 6, a vertical axis represents the basis weight of a sheet, and a horizontal axis of the graph represents the magnitude of the received light voltage.

The basis weight of a sheet is a weight per unit area of a sheet and can be deemed same as a thickness of the sheet. In other words, the larger the basis weight of a sheet is, the thicker the thickness of the sheet is, and the smaller the basis weight of a sheet is, the thinner the thickness of the sheet is.

In the present example, it is possible to calculate a thickness (class) of a sheet S from a received light voltage in the light receiving portion 102. As illustrated in FIG. 6, for example, in a case where a sheet is thin paper (paper having a small basis weight), a transmission amount of the light emitted from the light emitting portion 101 is increased, and therefore, the received light voltage in the light receiving portion 102 becomes high. On the other hand, in a case where a sheet is thick paper (paper having a large basis weight), a transmission amount of light emitted by the light emitting portion 101 is reduced, and therefore, the received light voltage in the light receiving portion 102 becomes low.

The light receiving portions 103 to 105 are arranged, with respect to a sheet S, on the same side of the side provided with the light emitting portion 101, and are arranged at different installation angles with respect to the sheet S. The light receiving portion 104 is installed at substantially the angle same as the installation angle of the light emitting portion 101 with respect to the sheet S (symmetrical position with respect to a perpendicular line of the sheet S). Additionally, the light receiving portion 103 is installed at the angle larger than that of the light receiving portion 104, and the light receiving portion 105 is installed at the angle smaller than that of the light receiving portion 104. The light emitted from the light emitting portion 101 is reflected on the sheet S and incident on each of the light receiving portions 103 to 105, and is converted into a received light voltage.

In the present example, it is possible to calculate smoothness and glossiness of a sheet S from the received light voltages of the light receiving portions 103 to 105.

Basically, the light reflected on a surface of the sheet S is reflected at an angle same as an incident angle with respect to the sheet S. Therefore, in a case where smoothness of a sheet surface is high like coated paper, a large amount of the reflected light is incident on the light receiving portion 104 installed at the same angle as the light emitting portion 101, and the received light voltage becomes high. Furthermore, in a case where glossiness of a sheet S is high, a reflection amount is increased, and therefore, a light received amount in the light receiving portion 104 is further increased and the received light voltage becomes high.

In contrast, in a case where sheet surface is rough and has many irregularities, incident light hitting the irregular surface of the sheet is reflected at various angles, and an incident light amount on the light receiving portion 104 is reduced and the received light voltage becomes lower than that of the coated paper, but incident light on each of the light receiving portions 103 and 105 is increased and the received light voltage thereof becomes high.

In the present example, the sheet characteristic information such as a paper kind, a thickness, and the like of a sheet S is determined from a detection result of the sheet characteristic detector 70 on the basis of a paper kind determination table illustrated in Table 1 below.

Meanwhile, the paper kind determination table is stored in the memory 72, but content of the paper kind determination table is merely an example, and numerical values and the like are suitably set in accordance with an installation environment and the like of the image forming apparatus.

TABLE 1

| TOTAL RECEIVED VOLTAGES OF LIGHT RECEIVING PORTIONS 103 TO 105 | RECEIVED LIGHT VOLTAGE OF LIGHT RECEIVING PORTION 104 | PAPER KIND |
|---|---|---|
| 5.0 OR MORE * RECEIVED LIGHT RATIO OF LIGHT RECEIVING PORTION IS HIGH = SMOOTHNESS IS HIGH | 3.0 V TO 5.0 V * GLOSSINESS IS HIGH | COATED PAPER |
| | LESS THAN 3.0 V | PLAIN PAPER |
| LESS THAN 5.0 | — | ROUGH PAPER |

Next, the controller 71 determines an image forming condition such as a printing speed in the image former 40 on the basis of information on sheet characteristics (sheet characteristic information) determined by the sheet characteristic detector 70, and turns on a drum motor, a development motor, an intermediate transfer belt motor, and a fixing motor to perform: voltage/current control for primary transfer and secondary transfer; and fixing temperature control in accordance with a paper kind and a basis weight which are the sheet characteristics. When activation of the respective motors is completed and the fixing temperature of the fixing unit 44 reaches a target temperature, sheet feeding is started in order to form an image.

A toner image on the photosensitive drum 41 is transferred to the intermediate transfer belt 42, the registration roller 65 is turned on so as to align the image with a leading edge of a sheet S on the secondary transfer roller 43, and the toner image is transferred onto the sheet S. The toner image on the sheet S is fixed by the fixing unit 44, conveyed to the sheet ejection device 30, and ejected to the sheet ejection tray 87.

In a case where a tray that feeds sheets includes the air sheet feeder 16, parameters such as a rotation speed of the suction fan 123 on the air sheet feeder 16 and the fixing temperature of the fixing unit 44 are determined by using the sheet characteristic information detected by the sheet characteristic detector 70 on the basis of, for example, an image condition table illustrated in Table 2 below stored in the memory 72, and air sheet feeding for a second and subsequent sheets is started. Meanwhile, contents of the image condition table of the present example are merely examples, and numerical values and the like are suitably set in accordance with an installation environment and the like of the image forming apparatus.

Figure 7:
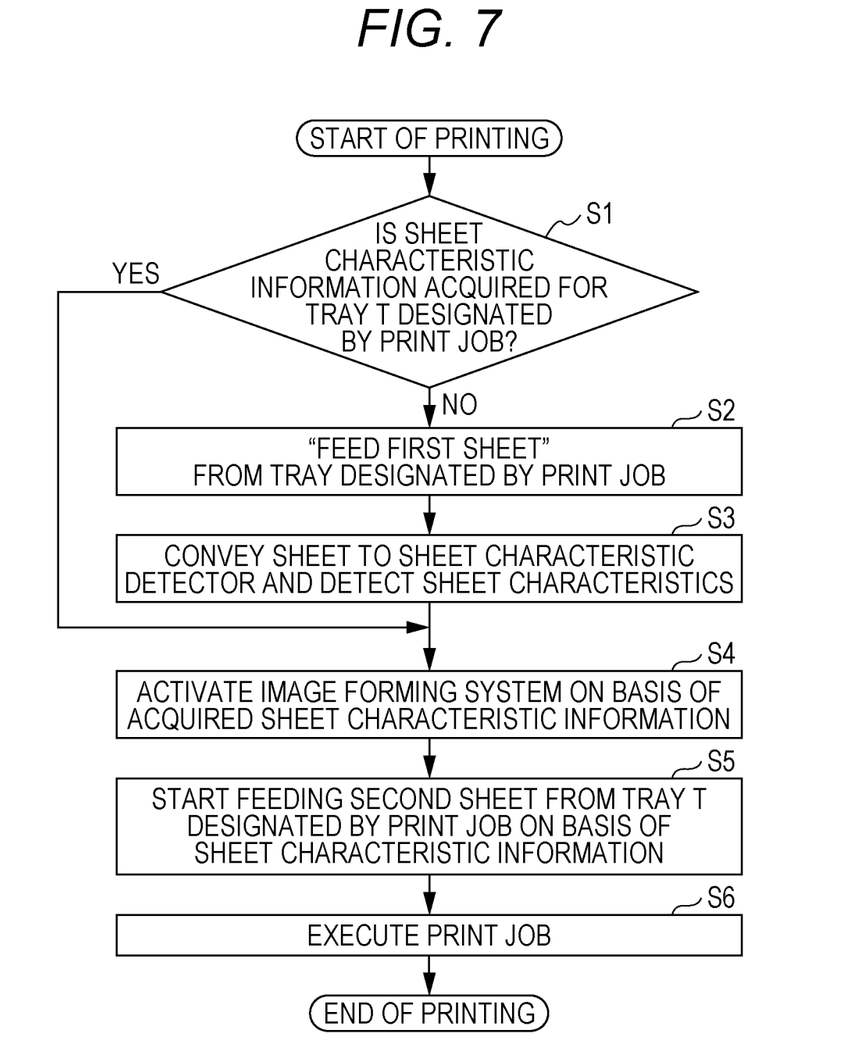
FIG. 7 is a flowchart illustrating print job execution processing executed in the image forming apparatus according to the embodiment of the present invention.

In a case where the sheet characteristic information of the sheets is already acquired in step S1 (YES in step S1), an image forming system of the image former 40 is activated on the basis of the acquired sheet characteristic information (step S4). In other words, in a case where the sheet characteristic information is acquired by manual setting or the like by a user, various settings related to image forming, for example, voltage/current output at the primary transfer/secondary transfer, a conveyance condition such as a printing speed, and a sheet feeding condition are determined on the basis of the acquired sheet characteristic information, and the image forming system and motors of a conveyance system are activated under the determined conditions.

On the other hand, in a case where the sheet characteristic information is not acquired yet in step S1 (NO in step S1), only one sheet S that is used for sheet characteristic detection (first sheet) is fed from the tray T designated by the print job (step S2).

Next, the first sheet fed from the tray T in step S2 is conveyed to the sheet characteristic detector 70 to acquire sheet characteristic information (step S3). In other words, the first sheet fed from the tray T is conveyed to the registration roller 65 via the conveyance path 80 and the like, and the sheet characteristic information is detected by the sheet characteristic detection sensor 70 to acquire the sheet characteristic information in a state in which the first sheet is made to abut on the registration roller 65 and stopped.

Next, the image forming system of the image former 40 is activated on the basis of the sheet characteristic information detected in step S3 (step S4), and feeding of a second sheet (second sheet) and subsequent sheets to be used for image forming is started from the tray T under the image forming condition activated in step S4 (step S5). A print job

TABLE 2

| | PAPER KIND | | |
|---|---|---|---|
| BASIS WEIGHT | COATED PAPER | PLAIN PAPER | ROUGH PAPER |
| 100 g/m² OR LESS | 170° C./HIGH SPEED | 180° C./HIGH SPEED | 190° C./HIGH SPEED |
| 101 TO 200 g/m² | 170° C./MEDIUM SPEED | 180° C./MEDIUM SPEED | 190° C./MEDIUM SPEED |
| 201 TO 300 g/m² | 175° C./MEDIUM SPEED | 175° C./LOW SPEED | 185° C./LOW SPEED |

Next, an image forming method executed in the image forming apparatus 100 of the present example will be described.

FIG. 7 is a flowchart illustrating processing of a print job executed in the image forming method of the present example. In the following description, it is assumed that sheets of the same type are stored in all of the trays.

As illustrated in FIG. 7, when a print job is started, determination is made on whether sheet characteristic information is acquired for the sheets stored in a tray T designated by the print job (step S1).

is executed on the second sheet fed in step S5 (step S6), and the print job is finished as soon as the print job is finished.

In the present example, in a case where the tray T designated by a print job is the tray T1 or T2, the sheet feeding roller 111 of the roller sheet feeder 15 of the tray T1 or T2 is rotated to convey, to the registration rollers 65, a sheet (first sheet) loaded on an uppermost portion of the sheet loading plate 115. Additionally, in a case where a tray designated by a print job is one of trays T3, T4, and T5, a sheet (first sheet) loaded on an uppermost portion of the sheet loading plate 125 is fed by air suction by the air sheet feeder 16 of the tray T3, T4, or T5 and conveyed to the registration roller 65.

As described above, according to the image forming apparatus and the image forming method of the present example, sheet characteristic information is first acquired by using one sheet (first sheet) out of sheets stored in a tray, and image forming conditions for a sheet (second sheet) used to form an image on second and subsequent sheets remaining in the tray are set on the basis of the acquired sheet characteristic information. Note that the image forming conditions of the present example include conveyance conditions, sheet feed conditions, and the like. Thus, since the sheet characteristic information is acquired by using only one sheet (first sheet), it is possible to reduce occurrence of sheet jam or the like at the time of sheet feeding. Furthermore, since an image is formed on the second sheet, namely, the second and subsequent sheets by using the image forming conditions set on the basis of the sheet characteristic information on the first sheet, a high quality image can be formed, occurrence of malfunctions such as sheet conveyance failure can be reduced, and productivity can be improved.

Additionally, in the above example, in a case of feeding a sheet by using the roller sheet feeder 15, a rotation speed of the sheet feeding roller 111 may not be necessarily set to a constant speed but may be suitably changed. For example, the rotation speed of the sheet feeding roller 111 at the time of feeding the first sheet may be lowered to about 50% of the rotation speed at the time of feeding the second sheet at the time of image forming. Since the rotation speed of the sheet feeding roller 111 at the time of feeding the first sheet is thus set differently from the rotation speed of the sheet feeding roller 111 at the time of feeding the second sheet, friction between the sheet S and the sheet feeding roller 111 is increased and slippage caused between the sheet feeding roller 111 and the sheet S is reduced, and the first sheet can be more reliably fed and furthermore productivity can be maintained.

Additionally, normally, in a case where a sheet S does not reach the sheet presence detection sensor 113 even after a lapse of a predetermined period from start of feeding of the sheet S by the sheet feeding roller 111, feeding operation is stopped deeming that a sheet jam is caused, however; in the present example, retry control may also be performed, instead of immediately stopping sheet feeding operation, so as to temporarily stop the sheet feeding roller 111 and then try again to feed the sheet S. Then, in a case where the sheet S does not reach the sheet presence detection sensor 113 even after repetition of the predetermined number of times (for example, three times) of feeding operation, feeding operation is stopped deeming that sheet jam is caused for the first time. Thus, since sheet feeding operation is not immediately stopped, a downtime can be reduced. Meanwhile, the rotation speed of the sheet feeding roller may also be changed together.

Next, a method of feeding a first sheet by using the air sheet feeder 16 will be described.

Figure 8:
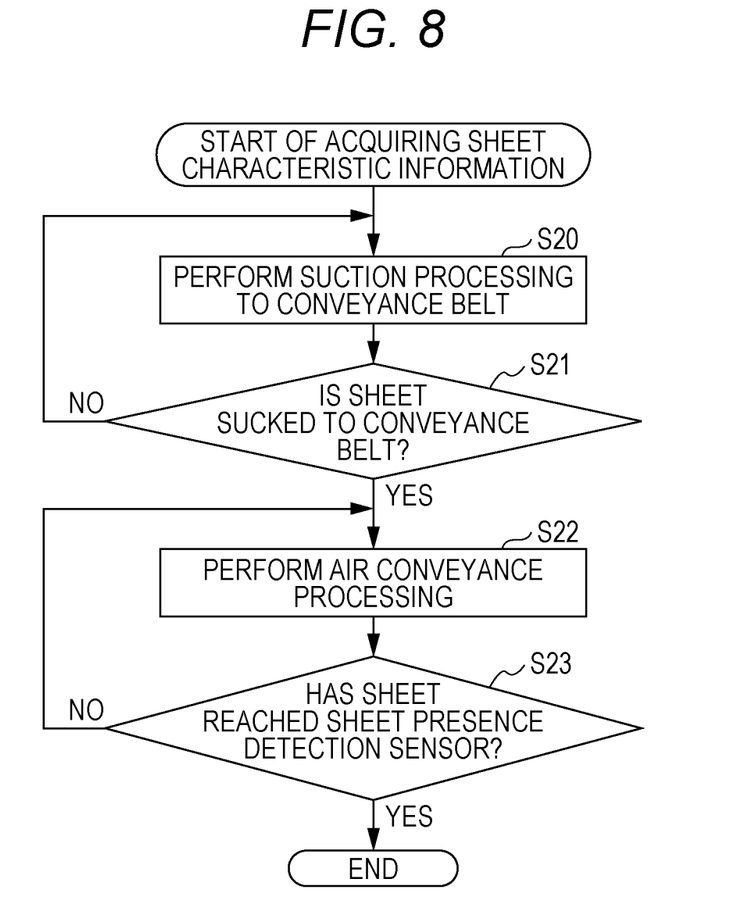
FIG. 8 is a flowchart of sheet feeding processing in a case where a tray designated by a print job includes an air sheet feeding mechanism.

FIG. 8 is a flowchart of sheet feeding processing in a case where a tray T designated by a print job includes the air sheet feeder 16.

When acquisition of sheet identification information is started, suction processing to the conveyance belt 122 is performed for sheet S as the first sheet (step S20). In the present example, rotation output (air flow rate) of the suction fan 123 is set to 30% in order to set an air flow rate of the suction fan 123 of the air sheet feeder 16 to the weakest state.

Next, the sheet suction sensor 126 attached to the conveyance belt 122 is monitored to check whether the sheet S is sucked to the conveyance belt 122 (step S21). In step S21, in a case where the sheet suction sensor 126 is not turned on even after lapse of a predetermined period (e.g., two seconds) (NO in step S21), it is determined that the sheet S is not sucked to the conveyance belt 122, and the air flow rate of the suction fan 123 in step S20 is stepwisely increased by 10%, and such stepwise increase is repeated until the sheet suction sensor 126 is turned on. In a case where the sheet suction sensor 126 is not turned on even when the air flow rate of the suction fan 123 is set to 100%, JAM stop processing is performed deeming that some malfunction is caused.

When the sheet suction sensor 126 is turned on in step S21 (YES in step S21), air conveyance processing by the conveyance belt 122 is started for the sheet S (step S22). In the air conveyance processing, the sheet S is fed to the sheet presence detection sensor 127 on the downstream side in a state in which the suction fan 123 is turned on and the sheet S is sucked to the conveyance belt 122.

In a case where the sheet S has reached the sheet presence detection sensor 127 within a predetermined period (YES in step S23), the air conveyance processing is finished deeming that sheet feeding processing is normally performed. Meanwhile, when the sheet S has reached the sheet presence detection sensor 127, the sheet S is conveyed to the exit sensor 128 by using the conveyance roller 124, and then the sheet S is conveyed to the downstream side by the conveyance roller 124 arranged more on the downstream side.

In a case where the sheet S does not reach the sheet presence detection sensor 127 within the predetermined period (NO in step S23), feeding operation by the conveyance belt 122 is temporarily turned off, and feeding by the conveyance belt 122 is retried in a state in which the air flow rate of the suction fan 123 is stepwisely increased (by 10%) in step S22.

In a case where the sheet suction sensor 126 is not turned on even though the airflow rate of the suction fan 123 is set to 100% (NO in step S23), air flow rates of the separation air fans (side fan and leading end fan) each having a function to float the sheet S is stepwisely increased (for example, by 10%) in step S22.

Then, in a case where the sheet presence detection sensor 127 is not turned on even when output of all of the fans reaches 100%, the JAM stop processing is performed deeming that sheet jam is caused on the sheet S.

In the present example, the feeding speed of the conveyance belt 122 is controlled so as to be constant, but the feeding speed of the conveyance belt 122 may be set to 50% of the speed at the time of normal image forming in order to suppress feeding operation failure of a first sheet. Since the air suction amount at the time of feeding the first sheet is thus set differently from the air suction amount at the time of feeding the second sheet, occurrence of a sheet feeding error such as no feed can be reduced by surely sucking the first sheet to the conveyance belt 122, and also a production amount can be maintained.

Meanwhile, in the present example, in a case where sheet characteristic detection is not completed, the image forming system is not started because the sheet characteristic information is unknown, however; it may also be possible to start operation of the image forming system by provisionally determining a paper kind and a basis weight at the time of starting printing, and after the sheet characteristic information is found out, the conditions may be switched to new conditions. As a result, in a case where the acquired sheet characteristic information is the same as the provisionally determined one, printing on a sheet can be performed in a state of activating the image forming system, and therefore, a downtime can be reduced.

Additionally, in the present example, an image is also formed on the first sheet used to acquire the sheet characteristic information, but there may be a case where wrinkles and the like are caused on the sheet at the time of detecting the sheet characteristic information, and therefore, the first sheet may be used only for sheet characteristic detection. In this case, printing is not performed on the first sheet, and the first sheet is ejected to the sub sheet ejection tray 88 of the sheet ejection device 30, for example.

Next, a description will be provided for an example of an embodiment in which, in a case where a tray T that feeds a first sheet designated by a the print job includes the air sheet feeder 16, the first sheet is fed from another tray T including the roller sheet feeder 15 where a sheet feed error such as no feed is hardly caused, instead of the tray T including the air sheet feeder 16.

Figure 9:
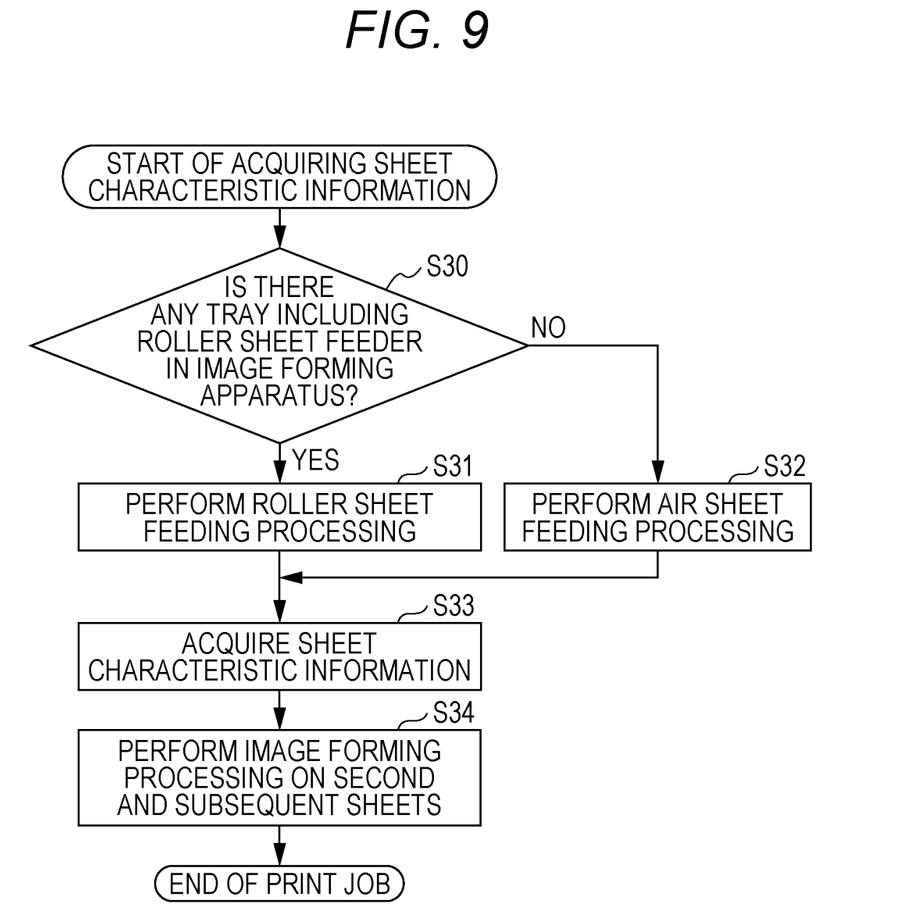
FIG. 9 is a flowchart of sheet feeding processing in a case where a tray in the image forming apparatus includes a roller sheet feeding mechanism.

FIG. 9 is a flowchart of sheet feeding processing in a case where a tray T designated by a print job includes the air sheet feeder 16.

When acquisition of sheet characteristic information is started, determination is made on whether there is any tray including the roller sheet feeder 15 in the image forming apparatus 100 (step S30).

In a case where there is another tray including the roller sheet feeder 15 in the image forming apparatus 100 (YES in step S30), the sheet feeding roller of the roller sheet feeder 15 of the tray is rotated to perform roller sheet feeding processing to feed a first sheet (step S31).

In a case where there is no tray including the roller sheet feeder 15 in the image forming apparatus 100 (NO in step S30), air sheet feeding processing is performed for the first sheet by the air sheet feeder 16 of the tray designated by the print job (step S32).

Next, sheet characteristic information is acquired by the sheet characteristic detector 70 by using the first sheet fed from the roller sheet feeder 15 or the air sheet feeder 16 (step S33). After the sheet characteristic information is acquired in step S33, a second sheet is fed by the air sheet feeder 16 of the tray T designated by the print job and image forming processing is performed for the same (step S34), and then the print job is finished.

According to the present example, in a state before acquiring the sheet characteristic information, the first sheet is surely fed from the tray including the roller sheet feeder 15 serving as the first sheet feeder where a sheet feeding error is caused with a less possibility than in the air sheet feeder 16, and the sheet characteristic information is acquired. Additionally, after acquisition of the sheet characteristic information is finished, productivity of printing can be improved by feeding a second sheet from a tray including the air sheet feeder 16 serving as the second sheet feeder that has higher sheet feeding performance than the roller sheet feeder 15 does.

Meanwhile, in the above example, described is the case where the roller sheet feeder 15 and the air sheet feeder 16 are provided in different trays, but the example can be applied to a case where the roller sheet feeder and the air sheet feeder are provided on the same tray. In this case, a first sheet is fed by the roller sheet feeder 15, and a second sheet is fed by the air sheet feeder 16. Note that the speed of the sheet feeding roller may be changed or retry control may be performed also in the present example. Alternatively, both may be combined.

Next, a description will be provided for a case where a user arbitrarily designates a tray T to feed a first sheet.

In the above-described embodiment, provided is the case where a tray T to feed a first sheet is set by a print job on the basis of automatic tray setting, but a user may also arbitrarily set a tray T to feed the first sheet. In the following, a description will be provided for a method in which a user sets a tray T to feed a first sheet in order to acquire sheet characteristic information by using FIG. 10.

Figure 10:
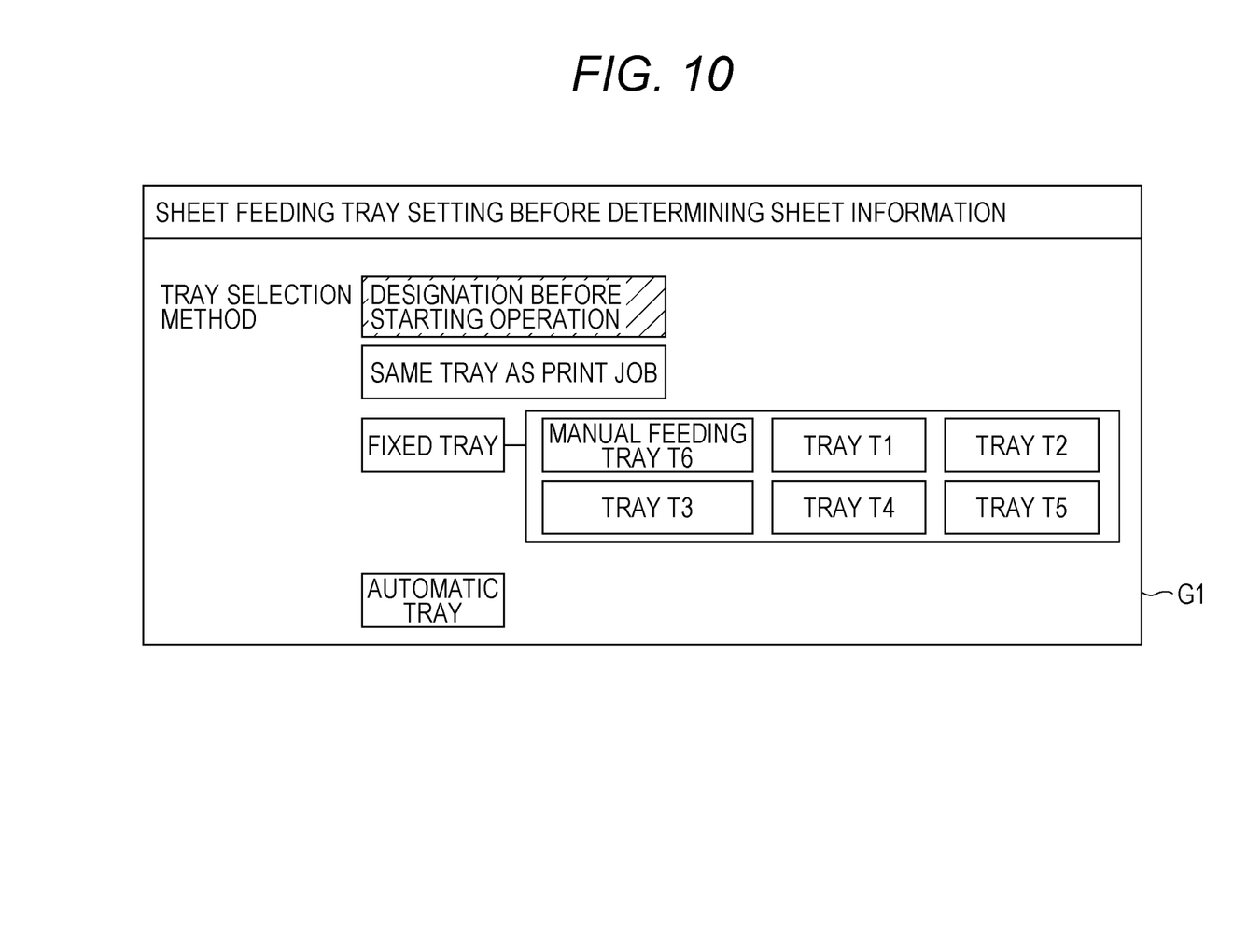
FIG. 10 is an example of a setting screen for a sheet feeding tray that feeds a first sheet.

FIG. 10 is an example of a setting screen for a tray T to feed a first sheet, and the setting screen is displayed on the display 12 as a storage designator.

A user selects one of "designation before starting operation", "same tray as print job", "fixed tray", and "automatic tray" from a setting screen G1. In the present example, "designation before starting operation" is selected. Meanwhile, a tray can be set not only by setting from the display 12 but also by using a printer driver that transmits a print job.

Figure 11:
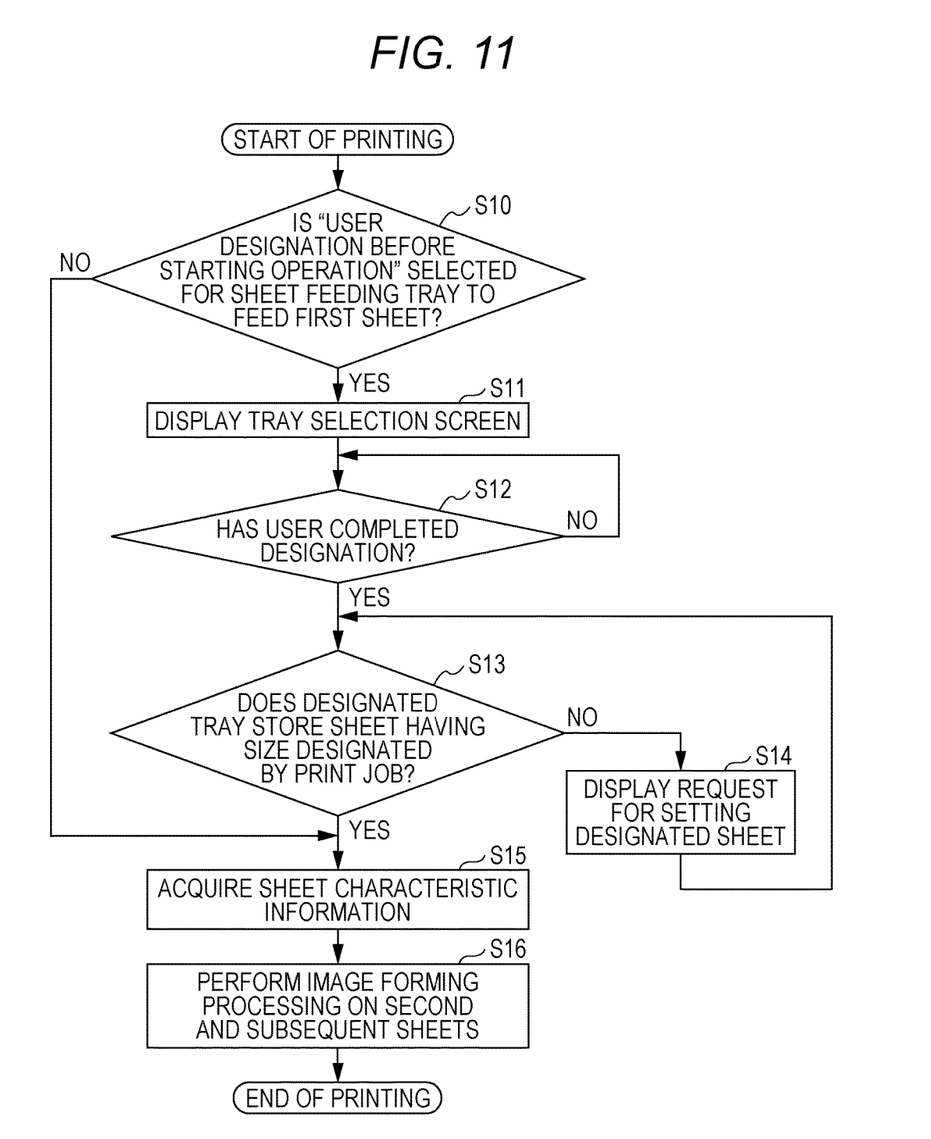
FIG. 11 is a flowchart illustrating processing to select a sheet feeding tray that feeds a first sheet.

FIG. 11 illustrates a flowchart in a case where a print job is started in a state in which sheet characteristic information is not acquired.

Figure 12:
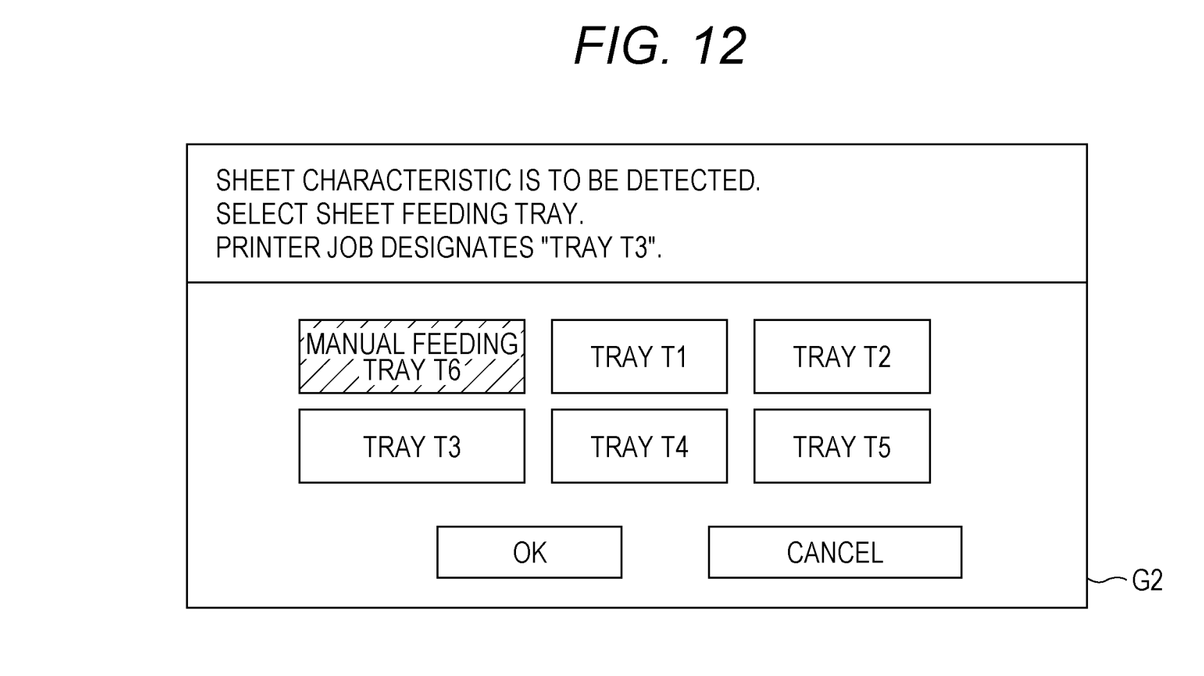
FIG. 12 is an exemplary selection screen for a sheet feeding tray that feeds a first sheet.

As illustrated in FIG. 11, it is confirmed whether the "designation before starting operation" is selected for a tray T to feed a first sheet in order to acquire sheet characteristic information (step S10). In step S10, in a case where the "designation before starting operation" is selected (YES in S10), an inquiry is made to the user which one of trays T is selected to feed the first sheet, and for example, a sheet feeding tray selection screen G2 as illustrated in FIG. 12 is displayed on the display 12 (step S11).

The user designates a sheet feeding tray T to feed the first sheet on the basis of the selection screen G2 (step S12). In a case where the user selects the manual feeding tray T6, the user selects the manual feeding tray and presses an OK button on the selection screen G2 as illustrated in FIG. 12. Next, it is confirmed whether a sheet having a size to be used in the print job is stored in the tray T6 designated by the user (step S13).

In step S13, in a case where the sheet to be used in the print job is set in the manual feeding tray T6 (YES in S13), feeding of the first sheet is started from the manual feeding tray T6. In a case where a sheet of the same size is not set in the manual feeding tray T6 (NO in step S13), a message "Please set a sheet in the manual feeding tray" is displayed on the display 12 or the like (step S14) to urge the user to set the sheet, and activation of the image forming system or the like is not started until the sheet is set in the manual feeding tray T6.

Next, sheet characteristic information is acquired by the sheet characteristic detector 70 by using the first sheet fed from the manual feeding tray T6 (step S15). After the sheet characteristic information is acquired in step S15, a second sheet is fed from a tray T (tray T3 in the present example) designated by a print job to perform image forming processing (step S16), and then the print job is finished.

As described above, according to the image forming apparatus and the image forming method of the present embodiment, occurrence of feeding failure of a first sheet used to determine a paper kind and the like can be suppressed, and a downtime can be reduced. Furthermore, since images are formed on second sheet, namely, the second and subsequent sheets under image forming conditions based on detection of the first sheet, high-quality images can be formed.

In the present example, the description has been provided by exemplifying the color image forming apparatus, but the present invention can also be applied to a monochrome image forming apparatus. Also, the image forming apparatus is not limited to a copying machine and may be a printer, a facsimile machine, or a multifunction peripheral having a plurality of functions.

Although embodiments of the present invention have been described and illustrated in detail, the disclosed embodiments are made for purposes of illustration and example only and an embodiment is not necessarily limited to the one including all of the above-described components. For example, some of the components of one embodiment can be replaced by components of another embodiment, and also, components of another embodiment can be added to the components of one embodiment. Also, addition of another component, deletion and replacement of some of the components in each embodiment can be made. The scope of the present invention should be interpreted by terms of the appended claims.

What is claimed is:

1. An image forming apparatus comprising:
   image former that forms an image on a sheet;
   a sheet storage that stores the sheet;
   a sheet feeder that feeds the sheet stored in the sheet storage to the image former;
   a sheet characteristic detector that detects characteristics of the sheet fed by the sheet feeder; and
   a hardware processor that controls image forming in the image former on the basis of the sheet characteristics detected by the sheet characteristic detector,
   wherein the sheet feeder feeds a first sheet in order to detect the sheet characteristics by the sheet characteristic detector before forming an image by the image former, and after the sheet characteristic detector has finished detecting the characteristics of the first sheet, the sheet feeder feeds a second sheet on which the image is to be formed by the image former under image forming conditions set on the basis of the detected characteristics of the first sheet, and
   wherein the sheet feeder is configured to feed the first sheet at a feeding speed lower than a feeding speed of the second sheet.

2. The image forming apparatus according to claim 1, wherein
   the sheet feeder includes a sheet feeding roller that feeds the sheet stored in the sheet storage, and
   a rotation speed to feed the first sheet by the sheet feeding roller is set differently from a rotation speed to feed the second sheet by the sheet feeding roller.

3. The image forming apparatus according to claim 1, wherein
   the sheet feeder includes an air conveyor that feeds the sheet stored in the sheet storage, and
   an air suction amount at the time of feeding the first sheet by the air conveyor is set differently from an air suction amount at the time of feeding the second sheet by the air conveyor.

4. The image forming apparatus according to claim 3, wherein the air conveyor includes a plurality of fans in order to adjust the air suction amount.

5. The image forming apparatus according to claim 1, wherein
   the sheet feeder includes:
   a first sheet feeder that feeds a first sheet in order to detect the characteristics by the sheet characteristic detector before an image is formed by the image former; and
   a second sheet feeder that feeds a second sheet on which an image is to be formed by the image former after the sheet characteristic detector has finished detection of the characteristics of the first sheet.

6. The image forming apparatus according to claim 5, wherein
   the first sheet feeder includes a sheet feeding roller that feeds a sheet from the sheet storage, and
   the second sheet feeder includes an air conveyor that feeds a sheet from the sheet storage by air suction.

7. The image forming apparatus according to claim 1, wherein the sheet characteristic detector is provided with a common conveyance path through which sheets are fed from a plurality of sheet storages.

8. The image forming apparatus according to claim 1, further comprising a storage designator that designates, from among a plurality of sheet storages, a sheet storage that feeds the first sheet used in order to detect the characteristics by the sheet characteristic detector.

9. The image forming apparatus according to claim 1, wherein the hardware processor starts the image forming by the image former after the sheet characteristic detector has finished detection of the characteristics of the first sheet.

10. The image forming apparatus according to claim 1, wherein the hardware processor prevents the image former from forming an image on the first sheet that has been subjected to characteristic detection by the sheet characteristic detector.

11. The image forming apparatus according to claim 1, further comprising a sheet detector that detects presence or absence of a sheet on a conveyance path through which the sheet fed from the sheet storage is conveyed to the image former.

12. An image forming method comprising:
    forming an image on a sheet by an image former included in an image forming apparatus;
    feeding a sheet stored in a sheet storage to the image former by a sheet feeder included in the image forming apparatus;
    detecting, by a sheet characteristic detector included in the image forming apparatus, characteristics of the sheet fed by the sheet feeder;
    controlling the forming of an image in the image former by a hardware processor included in the image forming apparatus on the basis of the sheet characteristics detected by the sheet characteristic detector; and
    feeding, by the sheet feeder, a first sheet in order to detect the sheet characteristics by the sheet characteristic detector before the forming of an image by the image former, and feeding a second sheet on which an image is to be formed by the image former under image forming conditions set on the basis of the detected characteristics of the first sheet after the detecting of the characteristics of the first sheet has been finished by the sheet characteristic detector,
    wherein a feeding speed of the first sheet is lower than a feeding speed of the second sheet.

* * * * *